June 26, 1951 N. E. W. CARTER 2,558,040

TELEPHONE MESSAGE RECORDING DEVICE

Filed July 29, 1947 3 Sheets-Sheet 1

INVENTOR

Norman Edward Wilson Carter

BY Otto Munk

HIS ATTORNEY

June 26, 1951 N. E. W. CARTER 2,558,040

TELEPHONE MESSAGE RECORDING DEVICE

Filed July 29, 1947 3 Sheets-Sheet 2

INVENTOR
Norman Edward Wilson Carter

BY Otto Munk
HIS ATTORNEY

June 26, 1951 N. E. W. CARTER 2,558,040

TELEPHONE MESSAGE RECORDING DEVICE

Filed July 29, 1947 3 Sheets-Sheet 3

INVENTOR
NORMAN EDWARD WILSON CARTER
BY Richardson, David and Nordon
ATTYS

Patented June 26, 1951

2,558,040

UNITED STATES PATENT OFFICE 2,558,040

TELEPHONE MESSAGE RECORDING DEVICE

Norman Edward Wilson Carter,
Cheltenham, England

Application July 29, 1947, Serial No. 764,431
In Great Britain April 5, 1944

Section 1, Public Law 690, August 8, 1946
Patent expires April 5, 1964

10 Claims. (Cl. 179—6)

This invention relates to telephone receivers and is concerned with sound recording systems for use in connection with such receivers and of the kind which are adapted to provide a permanent record of oral conversation, which can be reproduced when desired.

The primary object of this invention is to provide an improved sound recording system of the above kind which not only can be applied to existing telephone receivers without interfering with their normal operation but which will permit of the receiving subscriber using his telephone receiver in the normal way during recording.

A further object of the invention is to provide a sound recording system of the above kind which incorporates a timing device for limiting the maximum time of recording of each message so that the recording unit operates in an economical manner.

A further object of the invention is to provide a sound recording system of the above kind which not only permits of messages being recorded automatically in the absence of the subscriber but which also permits of a record of two-way conversation being obtained when desired.

A further object of the invention is to provide means whereby in the event of the calling subscriber finding the receiving subscriber absent the calling subscriber can inhibit operation of the sound recording system by the mere replacement of the calling subscriber's telephone unit.

Other objects of my invention will become apparent from the following description and claims of my specification in the drawings accompanying which:

In the construction illustrated, the apparatus includes a telephone instrument 5 of the type commonly used in connection with automatic exchanges.

As is well known, an incoming call on such an instrument operates the bell 6 associated therewith and normally the subscriber, if available, lifts the receiver 7 to take the call, whereupon the call-bell 6 is automatically cut out and the loop circuit through the instrument is completed to permit two-way communication between caller and subscriber, until the call is terminated by replacement of either of their receivers.

The apparatus hereinafter described provides primarily for the automatic recording of a message from the caller in the event of the subscriber not being available, but may also be employed to produce a permanent record of the matter received and/or transmitted in the event of a two-way communication being established.

Figure 1:
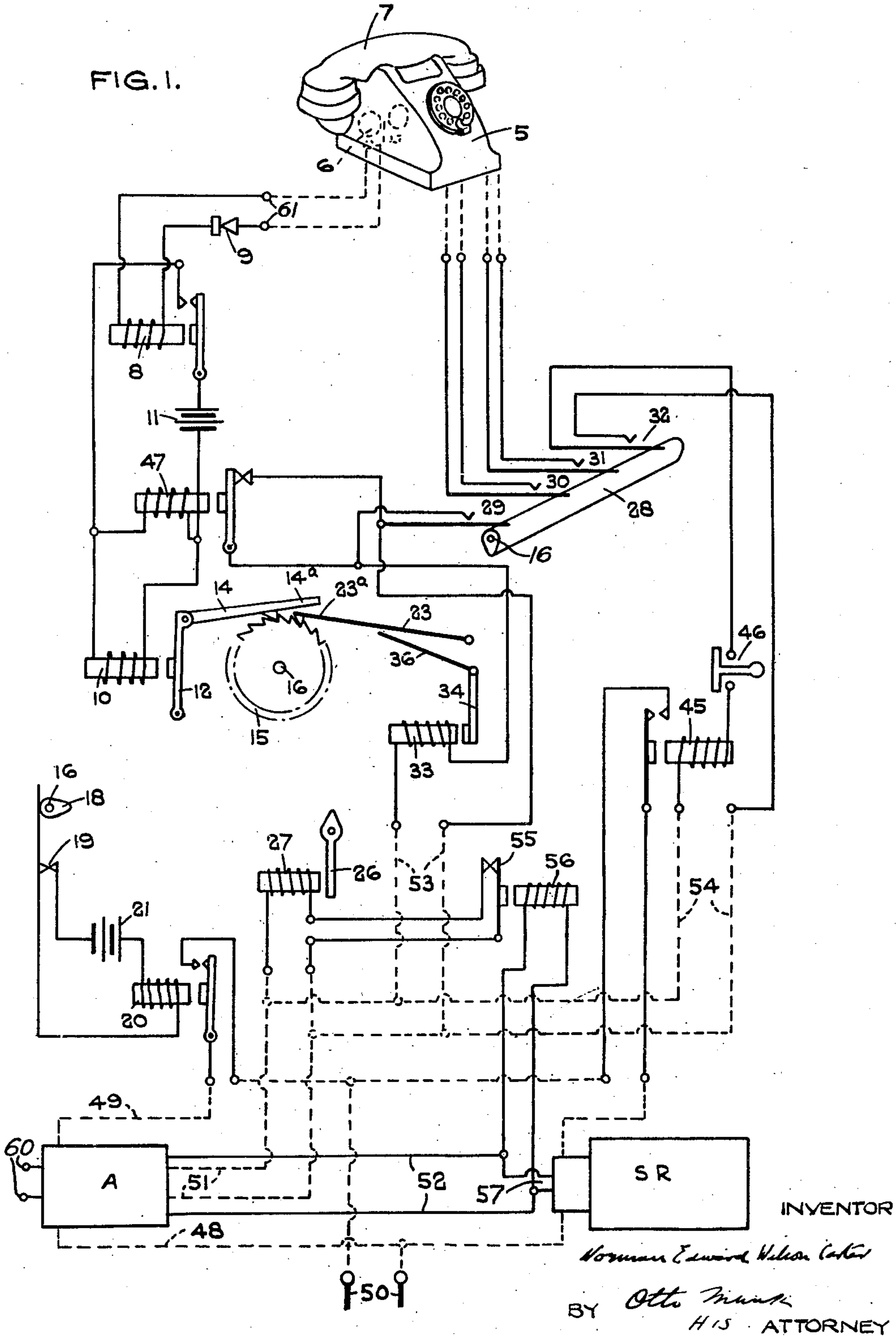
Figure 1 illustrates diagrammatically the various elements, and their electrical connections, in one form of apparatus embodying the present invention.
Figure 4:
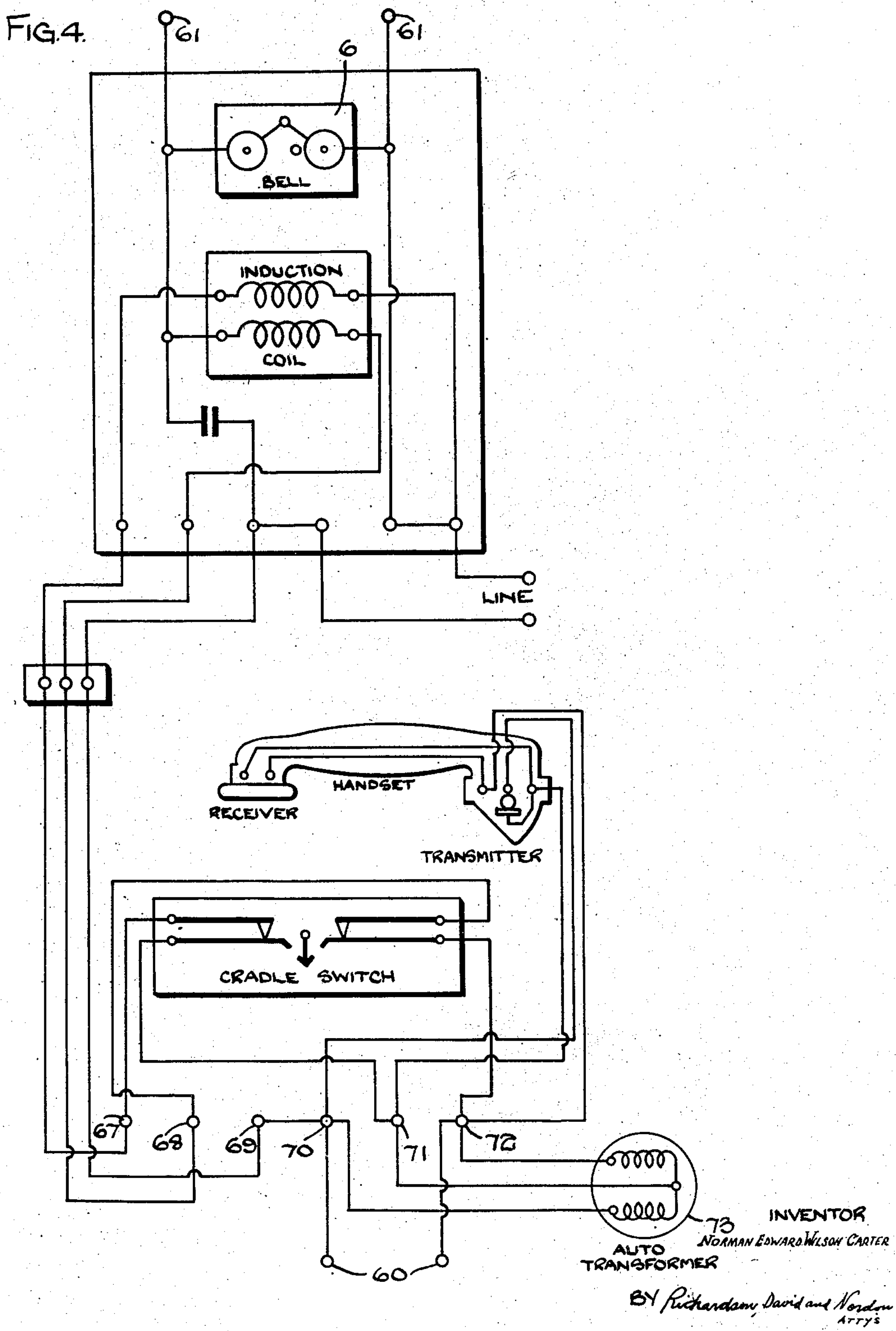
Figure 4 is a wiring diagram showing a conventional subscriber's instrument.

The apparatus includes a sensitive quick-make slow-release electro-magnetic relay 8, whose operating coil and a metal rectifier 9 presenting terminals 61 are suitably connected as indicated in Figures 1 and 4 to the call-bell circuit of the telephone instrument 5. With the automatic exchange system, the ringing current is interrupted at regular intervals and each ring of the bell 6 is accompanied by an energization of the relay 8 and the closing of its contacts.

Figures 2, 3:
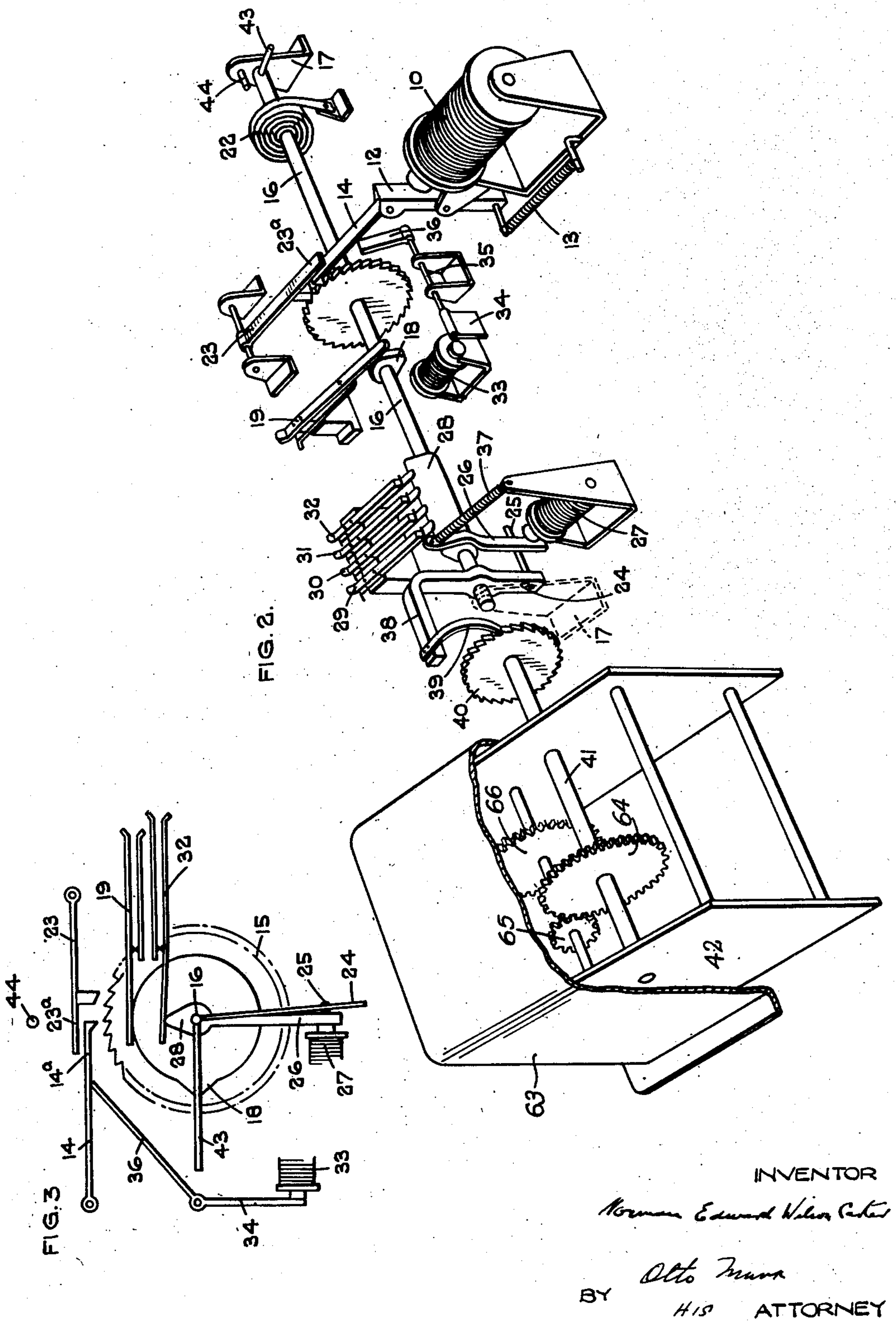
Figure 2 is a perspective view illustrating, also in diagrammatic form, the mechanism whereby the operation of the sound-recording unit is controlled.
Figure 3 is a further diagrammatic view showing in end elevation a part of the controlling mechanism aforesaid.

The contacts of the relay 8 are connected in a first local circuit with the coil of an electro-magnet 10 and a local battery 11, so that each time the contacts close, a second relay 10 is energized and the armature 12 associated therewith is attracted against the action of a spring 13 (as shown for convenience only in Figure 2).

A pawl 14 pivotally or otherwise connected to the armature 12 slips over the teeth of a ratchet wheel 15 whenever relay 10 becomes energized. Each time the ringing current ceases, the armature 12 is retracted by the spring 13 and the pawl 14 pushes the ratchet wheel 15 round one tooth.

Alternatively the arrangement may be such that the ratchet wheel 15 is pulled round one tooth each time the armature 12 is attracted by the electro-magnet 10.

The ratchet wheel 15 is fixed upon a shaft 16 journalled in brackets 17 (Figure 2) and having also secured thereon a cam 18 which acts upon a spring blade carrying the movable contact of a switch 19, the initial setting of the mechanism being such that this cam 18 holds the switch 19 open. As soon as the ratchet wheel 15 has been moved one tooth, the cam 18 allows the switch 19 to close, which completes a circuit through a third relay 20 and a second local battery 21. Obviously, if desired, a single battery may be used to operate the relay 10 and the relay 20.

Energization of the relay 20 causes its contacts to close and effects the switching on of A. C. supply to a suitable amplifier, indicated at A (Figure 1), which provides audio frequency amplification and a D. C. supply for purposes to be explained later.

The amplifier A is of generally known type and need not further be described and is connected through leads 48 and 49 to a mains supply of A. C. indicated at 50, connection to the latter by lead 49 being through relay 20 above described. The amplifier A has input terminals 60, is further provided with two pairs of output leads 51 and 52 which provide the D. C. supply and audio frequency signals respectively and which are connected as hereinafter described.

The input terminals 60 of the amplifier are connected in circuit with the transmitter and receiver of a conventional telephone a typical wiring diagram for which is depicted in Figure 4. For the sake of simplicity the wiring of the dialling unit has been omitted.

With the apparatus so far described it will be understood that as long as the subscriber's telephone remains unanswered, the ringing current continues to operate the relay 8, and consequently the relay 10, the movements of whose armature 12 cause the pawl 14 to rotate the ratchet wheel 15 tooth by tooth.

Rotation of the shaft 16 in this manner is resisted by a spiral or other torsion spring 22 (Figure 2) connected thereto and forming part of a re-setting means co-acting with the shaft, a second pivoted pawl 23 co-operating with the ratchet wheel 15 to prevent reversed motion of the latter during the return strokes of the pawl 14. As the ratchet wheel 15 is turned by the pawl 14, its teeth slip freely past the pawl 23.

Fixed to the same shaft 16 as the ratchet wheel 15 and cam 18 is an arm 24 (Figure 2) carrying a driving pin 25 (Figure 2) which, on continued angular movement of the arm 24, eventually engages the armature 26 of an electro-magnet 27, such electro-magnet being energised by the D. C. supply from the output side of amplifier A through leads 51.

The armature 26 aforesaid is rigidly connected at one end to a wide cam 28 referred to in the claims as the second cam formed of insulating material which is freely mounted upon the shaft 16. The armature 26 and cam 28 are thereupon carried round the shaft axis by the driving pin 25 until the free end of the armature 25 engages the pole piece of the electro-magnet 27, which is being energized by the D. C. supply from the amplifier A and consequently holds the armature 26 in this position.

By this time the wide cam 28 has actuated a set of spring blades carrying the movable contacts of a bank of contacts 29, 30, 31, 32, in such a manner that the latter (normally all open) are simultaneously closed.

The pair of contacts 29, on closing, causes an electro-magnet 33 to be energized by D. C. supply from the amplifier A (to the output side of which it is connected by leads 53 and leads 51 aforesaid), such energization resulting in attraction of its armature 34, which latter is fixed upon a short shaft 35 (Figure 2) also carrying an arm 36 (Figure 2).

This arm 36 is disposed beneath either the holding pawl 23, as in Figure 1, or the driving pawl 14, as in Figures 2 and 3, the pawl in question having its free end overlapped by an extension 14*a*, 23*a* (as the case may be) of the other pawl.

When the armautre 34 is attracted by the electro-magnet the arm 36 lifts the lower pawl, which in turn raises the upper pawl through the medium of the extension aforesaid, so that both pawls 14, 23 are disengaged from the ratchet wheel 15 and the spring 22 is free to rotate the shaft 16 in the reverse direction, these devices constituting re-setting means for the controlling mechanism comprising a shaft 16, cam 18 and ratchet wheel 15.

An arm 38 fixed to the shaft 16, and preferably integral with the arm 24, carries a spring pawl 39 which co-operates with a second ratchet wheel 40 on a shaft 41 aligned with the shaft 16.

This shaft 41 forms the driving spindle of a time limiting unit, indicated generally at 42, which includes a train of gears 64, 65, 66 and an escapement mechanism not visible by virtue of the housing 63.

The teeth of the ratchet wheel 40 are oppositely arranged with reference to those on the ratchet wheel 15, so that, as the latter is stepped round, the pawl 39 slips over the ratchet wheel 40, but on reverse rotation of the shaft 16 by the spring 22 the pawl 39 transmits such rotation to the timing device 42. Thus the return of the shaft 16 to its initial position by the spring 22 can only take place under the control of the timing device 42 and occupies a period of time predetermined by the escapement mechanism of the latter.

This initial or "off" position of the shaft 16 is defined by engagement of an arm 43 on the shaft with a pin 44 projecting from one of the brackets 17, and by the time the shaft 16 has returned to this position the cam 18 has again opened the switch 19, thus causing the relay 20 to disconnect the amplifier A and cutting off the D. C. supply therefrom to the electro-magnets 27, 33; the de-energization of the electro-magnet 27 allows the cam 28 to return to an inoperative position under the influence of a suitable return spring 37, so that the contacts 29, 30, 31, 32 all re-open.

Reverting to this bank of contacts those numbered 30 and 31 are wired to the telephone instrument 5 and, on closing, simply make the connections which would have been made had the receiver 7 been lifted from its cradle or rest in the normal manner, that is to say, the circuit through to the caller's instrument is completed. The contacts 30 and 31 are in fact in parallel with the contacts 73, 74 (Figure 4) which are closed when the handset of the telephone is raised from its cradle and are connected across terminals 67, 71 and 68, 72 (all shown on Figure 4) respectively. The fourth pair of contacts 32, on closing, completes a local circuit, which is also fed with D. C. supply from the amplifier A through the medium of leads 51 and 54, this current energizing the operating coil of a relay 45 whose contacts thereupon close to switch on A. C. supply to the driving motor of a sound-recording unit (indicated at S. R.), which A. C. supply is obtained from the mains 50.

This unit may be of any suitable type, employing either wax cylinders, continuous ribbons or discs. Instead of the electric motor referred to above, the cylinder, ribbon or disc may be driven by clockwork set in motion by the relay 45. The incoming message to be recorded appears as a signal voltage across terminals 70 and 72 (Figure 4) as soon as contacts 30 and 31 have been closed (or if the handset is raised from its cradle) and this is consequently impressed upon the amplifier input terminals 60. If the handset is in use the conventional anti-side-tone autotransformer 73 ensures that the level of the voltage appearing across terminals 70 and 72 as a result of speaking into the transmitter of the handset is approximately equal to that due to incoming messages and hence the amplifier is not overloaded and satisfactory recording of a two-way conversation can take place. The audio frequency voltage to be recorded is amplified by amplifier A and fed to the sound recorder by leads 52 and 57 and is imposed on the recording medium of the recorder in the usual way. The sound recorder is further provided with the usual manually operated switch for effecting recording and reproducing, as desired.

Included in the same circuit is a manual recorder switch 46 (Figure 1) of the delayed-action type; that is to say, one which, on being pressed off, automatically returns to the "on" position after an interval of, say, five minutes. Should the subscriber be available to answer his telephone, this switch 46 enables him to shut off the sound recorder SR and take the call in the normal way, or alternatively he may leave the sound-recorder running so as to obtain a record of the two-way conversation.

Assuming that the telephone remains unanswered, or that the subscriber leaves the sound-recorder SR in operation as aforesaid, recording will continue until the time limiting unit 42 allows the shaft 16 and associated parts to return to the "off" position, in which the amplifier A is switched off, the pawls 14, 23 having re-engaged the ratchet wheel 15 due to lack of energizing current for their controlling relay and electro-magnet 10, 33, the call-bell 6 is again in circuit, and the whole apparatus is ready for the next call.

It will be seen that, with the apparatus as thus far described, the automatic return of the shaft 16 to its "off" position under the influence of the spring 22 cannot take place if the subscriber should happen to pick up the receiver 7 before the cam 28 has been turned sufficiently far to close the contacts 29, as until this occurs the electro-magnet 33 is not energized and the pawl 14 remains in engagement with the ratchet wheel 15.

To ensure the automatic return of the shaft 16, irrespective of its position when the subscriber picks up the receiver 7, a fourth relay 47 is introduced, its operating coil being connected across that of the relay 10, so that it becomes energized simultaneously by current from the local battery 11 each time the contacts of the relay 8 are closed by the ringing current.

The relay 47 is designed with quick make and extremely slow releasing characteristics; that is to say its action is sufficiently slow for its contacts to remain open during the periodic interruptions of the ringing current.

The contacts of the relay 47 are connected across the contacts 29 and, under normal conditions, merely supplement the latter when closed. If, however, the relay 47 becomes de-energized due to lifting of the receiver 7, and consequent cessation of the ringing current, before the contacts 29 has closed, the closed relay contacts provide an alternative path for the D. C. supply from the amplifier A. This causes energization of the electro-magnet 33 and release of the pawl 14 from the ratchet wheel 15.

The time limiting unit 42 is set in accordance with whatever may prove in practice to be the average length of dictated messages; for example, provision may be made for a run of two minutes, which will enable a reasonable number of messages to be recorded upon a given cylinder, ribbon or disc.

Provision may be made, by means of additional cams on the shaft 16 and appropriate switches, for the transmission to the caller of a warning signal when the timing device 42 is nearing the end of its run. Such signal could take the form of high-pitched "pips" derived from the local valve oscillator. Alternatively, or in addition, provision may be made for a similar signal to indicate that recording is about to commence.

It is intended that the apparatus forming the subject of the present invention shall be supplied to telephone subscribers on a rental basis, in which case the fact that a given subscriber is provided with the apparatus in question may be made known to the public by a suitable notice or other indication in telephone directories or elsewhere. In the event of extensive adoption of the apparatus, however, it is thought that the mere fact of a subscriber's telephone having become "alive" without being answered will be sufficient indication to a caller that such a recording apparatus is in operation, especially if a distinctive signal is also heard.

If the caller is unable to dictate his message within the period allowed by the time limiting unit 42, which is most unlikely, he has, of course, the option of making a further call.

In the event of a caller calling the receiving subscriber finding him absent and the caller not wishing to give a message, the caller would, of course, replace his own receiver in the usual way and in order to avoid the sound recorder operating for the pre-determined period above mentioned and thus wasting recording material in the absence of any message from the caller as would occur with the apparatus as so far described, a device comprising a relay having contacts 55 is provided in series with the electro-magnet 27, this relay being normally closed and having its electro-magnet 56 operated from the audio frequency output side of the amplifier A to which it is connected by leads 52 as aforesaid.

The relay coil or electro-magnet 56 is tuned to the normal dialling frequency of the telephone exchaneg system and in the event of the caller cancelling the call without recording a message so that the caller hangs up his receiver, the dialling tone frequency would then be transmitted to the amplifier A and from the audio frequency output side thereof through leads 52 to the electro-magnet 56 causing the relay 55 to open and thus to break the circuit of the electro-magnet 27.

The armatures 26 would then immediately be released permitting of the cam 28 returning to its inoperative position so that the switches 29, 30, 31 and 32 all re-open and the sound recording unit is brought to rest while the subscriber's receiving telephone system reverts to normal.

The electro-magnet 56 is tuned to respond to the normal dialling frequency but is not responsive to normal voice frequencies as met with in normal telephone practice so that the relay contacts 55 only operate under the circumstances above enumerated. Such a type of relay is well known in the art and does not require any detailed description.

Obviously the apparatus described is capable of numerous modifications within the spirit of the invention. For example, the D. C. supply for operating the electro-magnets 27, 33 and the relay 45 may be obtained from a mains rectifier unit instead of from the amplifier A.

Furthermore, instead of the shaft 16 being rotated by means of the relay 10, armature 12 and pawl 14, it may be connected through suitable gearing to a normal electric motor which is switched on by a relay working in conjunction with the relay 8. The torsion spring 22 on unwinding would in this case rotate the driving motor in the reverse direction.

The various elements of the apparatus have not been described in detail, because in all cases commercially manufactured components may be employed. The illustrated disposition of the parts may be altered as found necessary or desirable, in order to provide a compact assembly.

For home or business use, the whole apparatus, including the amplifier A and sound-recorder SR, may be enclosed in a cabinet or other casing, the top of which supports the telephone instrument 5.

If the subscriber is present and wishes to obtain a permanent record of the matter received and/or transmitted in the event of a two-way communication being established, it is necessary for him merely to wait a short while after the first ring of the bell before lifting the receiver so as to allow time for the shaft 28 to rotate and operate the various switches. Alternatively, the subscriber can rotate the shaft by hand so as to set the sound recording device in operation.

I claim:

1. In a message recorder for a subscriber's telephone installation, a message signal amplifier having means for connecting it permanently in circuit with a transmitter and receiver of a handset of said installation, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals, controlling mechanism operatively associated therewith for making a pair of said contacts after a predetermined ringing period to energize the amplifier, re-setting means co-acting with said controlling mechanism to break said pair of contacts after a predetermined delay, and, an auxiliary control device under the control of the subscriber operatively associated with a pair of said make and break contacts through which power is fed to the recorder.

2. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals, controlling mechanism operatively associated therewith for making a pair of said contacts after a predetermined ringing period to energize the amplifier, said controlling mechanism comprising, a cam, a switch operated thereby connected in a second local circuit which includes a relay coil operatively associated with said pair of make and break contacts, and a pawl ratchet unit connected operatively to said cam and actuated by said responsive device to transmit step by step movement to the cam, and re-setting means coacting with said pawl and ratchet unit to reset the cam and break said pair of contacts after a predetermined delay.

3. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals operatively associated with controlling mechanism for making a pair of said contacts after a predetermined ringing period to energize the amplifier, said device comprising, a first local circuit including a relay system having a first relay, means for feeding said first relay with call bell signals, said first relay having its relay contacts in series with the winding of a second relay, said second relay having an armature, and said controlling mechanism comprising, a cam, a switch operated thereby connected in a second local circuit which includes a relay coil operatively associated with said pair of make and break contacts, and a pawl and ratchet unit whereof the pawl is operatively connected to the armature of said second relay to transmit step by step movement to the cam, and, resetting means coacting with said pawl and ratchet unit to reset the cam and break said pair of contacts after a predetermined delay.

4. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals operatively associated with controlling mechanism for making a pair of said contacts after a predetermined ringing period to energize the amplifier, said device comprising, a first local circuit including a relay system having a first relay, means for feeding said first relay with call bell signals, said first relay having its relay contacts in series with the winding of a second relay, said second relay having an armature, and, said controlling mechanism comprising, a rotary shaft, a cam, fixed on said shaft, and a switch operated by said cam and connected in a second local circuit which includes a relay coil operatively associated with said pair of make and break contacts, and, a pawl and ratchet unit whereof the pawl is operatively connected to the armature of said second relay to transmit step by step movement to the cam, a further pawl engaging the teeth of the ratchet wheel, pivotally supported arms carrying said pawls, part of one arm lying intermediate the other arm and the ratchet wheel, a second cam freely mounted on the rotary shaft, a driver for said second cam comprising, an arm fixed on the shaft and extending radially therefrom and having a pin engaging an armature fixed to the second cam and extending approximately radially with respect to the shaft, a bank of contacts including a pair of resetting contacts controlled by said second cam, biasing means coupled to said second cam to bias it towards an inoperative position in which said resetting contacts are open, an electromagnet energized by a D. C. supply derived from the amplifier and positioned to retain the second cam armature in a position corresponding to the operative position of the cam presetting means, comprising, a spring coupled to the shaft and stressed to return the shaft to its initial position, and electromagnetic means energized by closing of the resetting contacts for deflecting the pawl arms to free the shaft for return movement.

5. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals operatively associated with controlling mechanism for making a pair of said contacts, after a predetermined ringing period to energize the amplifier, said controlling mechanism comprising, a rotary shaft, carrying cams for operating switch contacts and revoluble in one direction in response to call bell signals including a pair of resetting contacts, re-setting means comprising, a spring coupled to the shaft and stressed to return the shaft to its initial position, and electromagnetic means adapted to free the shaft from return movement and, a time limiting unit comprising, a ratchet wheel mounted on a spindle aligned with said shaft and co-operating with a pawl mounted on an arm fixed to said shaft, said pawl and ratchet wheel co-acting to form a driving connection between the shaft and spindle for return movement of the former.

6. In a message recorder for a subscriber's telephone installation, a message signal amplifier having means for connecting it permanently in circuit with a transmitter and receiver of a hand-set of said installation, a sound recording unit connected electrically to said amplifier, a power supply circuit for said amplifier and recorder, including a first pair of make and break contacts for establishing and disconnecting the power supply to and from the amplifier and a second pair of make and break contacts for establishing and disconnecting the power supply to and from the recorder, said second pair of contacts having a relay coil for actuation thereof connected electrically to a power supply unit associated operatively with said amplifier, a local circuit including a device responsive to call bell signals operatively associated with a controlling mechanism for making said first pair of contacts after a predetermined ringing period, re-setting means co-acting with said controlling mechanism to break said pair of contacts after a predetermined delay, and, an auxiliary control device under the control of the subscribers comprising a recorder switch in circuit with said relay coil.

7. In a message recorder for a subscriber's telephone installation, a message signal amplifier having means for connecting it permanently in circuit with a transmitter and receiver of a hand-set of said installation, a sound recording unit connected electrically to said amplifier, a power supply circuit for said amplifier and recorder, including a first pair of make and break contacts for establishing and disconnecting the power supply to and from the amplifier and a second pair of make and break contacts for establishing and disconnecting the power supply to and from the recorder, said second pair of contacts having a relay coil for actuation thereof connected electrically to a power supply unit associated operatively with said amplifier, a local circuit including a device responsive to call bell signals operatively associated with a controlling mechanism for making said first pair of contacts after a predetermined ringing period, resetting means co-acting with said controlling mechanism to break said pair of contacts after a predetermined delay, and, an auxiliary control device under the control of the subscribers comprising a delayed action recorder switch in circuit with said relay coil.

8. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals operatively associated with controlling mechanism for making a pair of said contacts after a predetermined ringing period to energize the amplifier, said device comprising, a first local circuit including a relay system having a first relay, means for feeding said first relay with call bell signals, said first relay having its relay contacts in series with the winding of a second relay, said second relay having an armature, and, said controlling mechanism comprising, a rotary shaft, a cam, fixed on said shaft, and a switch operated by said cam and connected in a second local circuit which includes a relay coil operatively associated with said pair of make and break contacts, and, a pawl and ratchet unit whereof the pawl is operatively connected to the armature of said second relay to transmit step by step movement to the cam, a further pawl engaging the teeth of the ratchet wheel, pivotally supported arms carrying said pawls, part of one arm lying intermediate the other arm and the ratchet wheel, a second cam freely mounted on the rotary shaft, a driver for said second cam comprising, an arm fixed on the shaft and extending radially therefrom and having a pin engaging an armature fixed to the second cam and extending approximately radially with respect to the shaft, a bank of contacts including a pair of resetting contacts controlled by said second cam, biasing means coupled to said second cam to bias it towards an inoperative position in which said re-setting contacts are open, an electromagnet energized by a D. C. supply derived from the amplifier and positioned to retain the second cam armature in a position corresponding to the operative position of the cam resetting means, comprising, a spring coupled to the shaft and stressed to return the shaft to its initial position, and electromagnetic means for deflecting the pawl arms to free the shaft for return movement connected in circuit with said re-setting contacts and a power supply unit, said resetting contacts having connected in shunt therewith a further pair of contacts provided with a relay coil for actuation thereof which is connected in said first local circuit, and is responsive to open and close said contacts in correspondence with the maintenance and cessation respectively of call bell signals.

9. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals operatively associated with controlling mechanism for making a pair of said contacts after a predetermined ringing period to energize the amplifier, said device comprising, a first local circuit including a relay system having a first relay, means for feeding said first relay with call bell signals, said first relay having its relay contacts in series with the winding of a second relay, said second relay having an armature, and, said controlling mechanism comprising, a rotary shaft, a cam, fixed on said shaft, and a switch operated by said cam and connected in a second local circuit which includes a relay coil operatively associated with said pair of make and break contacts, and, a pawl and ratchet unit whereof the pawl is operatively connected to the armature of said second relay to transmit step by step movement to the cam, a further pawl engaging the teeth of the ratchet wheel, pivotally supported arms carrying said pawls part of one arm lying intermediate the other arm and the ratchet wheel, a second cam freely mounted on the rotary shaft, a driver for said second cam comprising, an arm fixed on the shaft and extending radially therefrom and having a pin engaging an armature fixed to the second cam and extending approximately radially with respect to the shaft, a bank of contacts including a pair of resetting contacts controlled by said second cam, biasing means coupled to said second cam to bias it towards an inoperative position in which said resetting contacts are open, an electromagnet energized by a D. C. supply and positioned to retain the second cam armature in a position corresponding to the operative position of the cam, and a pair of contacts connected in series with said electromagnet and having for their actuation a relay coil tuned to dialling tone frequency connected to a message signal output circuit of said amplifier, to open said contacts in response to the reception of a dialling tone signal by the amplifier, resetting means comprising, a spring coupled to the shaft and stressed to return the shaft to its initial position, and electromagnetic means energized by closing of the resetting contacts for deflecting the pawl arms to free the shaft for return movement.

10. In a message recorder for a subscriber's telephone installation, a message signal amplifier, a sound recording unit connected electrically to said amplifier, a power supply circuit for said amplifier and recorder, make and break contacts in said power supply circuit for establishing and disconnecting the power supply to and from the amplifier and recorder, a local circuit including a device responsive to call bell signals, controlling mechanism operatively associated therewith for making and breaking a pair of said contacts after a predetermined ringing period to energize the amplifier, said controlling mechanism comprising, a movable controlling assembly operatively coupled to said responsive device, a switch connected to said assembly and electrically connected in a second local circuit which includes a relay coil operatively associated with said pair of make and break contacts, and resetting means co-acting with said controlling mechanism to break said pair of contacts after a predetermined delay.

NORMAN EDWARD WILSON CARTER.

REFERENCES CITED

The following references are of record in the file of this patent:

UNITED STATES PATENTS

| Number | Name | Date |
|---|---|---|
| 1,845,034 | Bickelhaupt | Feb. 16, 1932 |
| 1,973,081 | Keiser | Sept. 11, 1934 |
| 2,261,420 | Shiveley et al. | Nov. 4, 1941 |
| 2,282,100 | Thompson | May 6, 1942 |
| 2,393,272 | Van Deventer | Jan. 22, 1946 |